US006521672B1

(12) United States Patent
Glück et al.

(10) Patent No.: US 6,521,672 B1
(45) Date of Patent: Feb. 18, 2003

(54) OPEN-CELL PARTICULATE FOAMS

(75) Inventors: Guiscard Glück, Mainz (DE); Franz-Josef Dietzen, Ludwigshafen (DE); Klaus Hahn, Kirchheim (DE); Gerd Ehrmann, Deidesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,502

(22) PCT Filed: May 3, 2000

(86) PCT No.: PCT/EP00/03966

§ 371 (c)(1),
(2), (4) Date: Nov. 13, 2001

(87) PCT Pub. No.: WO00/68306

PCT Pub. Date: Nov. 16, 2000

(30) Foreign Application Priority Data

May 10, 1999 (DE) .......................................... 199 21 386

(51) Int. Cl.⁷ .................................................. C08J 9/00
(52) U.S. Cl. ......................................................... 521/50
(58) Field of Search ............................. 521/81, 146, 59, 521/134

(56) References Cited

U.S. PATENT DOCUMENTS

| 4,452,751 A | 6/1984 | McCullough et al. |
| 5,618,853 A | 4/1997 | Vonken et al. |

FOREIGN PATENT DOCUMENTS

| EP | 0 055 460 | 7/1982 |
| EP | 0 191 327 | 8/1986 |
| EP | 0 642 907 | 3/1995 |
| GB | 2 322 100 | 8/1998 |
| WO | WO 97/22656 | 6/1997 |
| WO | WO 98/58991 | 12/1998 |
| WO | WO 99/47592 | 9/1999 |

*Primary Examiner*—Morton Foelak
(74) *Attorney, Agent, or Firm*—Oblon, Spivak, McClelland, Maier & Neustadt, P.C.

(57) ABSTRACT

Open-cell moldable foams are based on a thermoplastic matrix which comprises A. from 99 to 50% by weight of a styrene polymer and B. from 1 to 50% by weight of a polymer of low compatibility with the styrene polymer.

19 Claims, No Drawings

OPEN-CELL PARTICULATE FOAMS

The invention relates to open-cell moldable foams based on styrene polymers.

An advantage of open-cell foams is that they can be evacuated. The resultant evacuated vacuum moldings have considerably lower thermal conductivity and are therefore significantly better insulators than conventional foams.

Open-cell extruded foam sheets and open-cell extruded foam boards based on styrene polymers are known, e.g. from EP-A 642,907, WO 9600258 and WO 96/34038. They are produced by extruding a polystyrene melt to which a volatile blowing agent and a nucleating agent have been added, at temperatures of from 110 to 140° C. In WO 98/58991, from 0.1 to 7% by weight of an ethylene-vinyl acetate copolymer is to be added to the polystyrene during the process.

However, foam sheets and foam boards are of simple shape. Their thickness and width is predetermined by the dimensions of the extrusion equipment.

Polystyrene foam moldings of any desired dimensions and shape may be produced in a known manner by foaming polystyrene pellets comprising blowing agents and sintering the resultant moldable foam.

It is an object of the present invention to provide open-cell moldable foams based on styrene polymers.

We have found that this object is achieved if the thermoplastic matrix comprises A. from 99 to 50% by weight of a styrene polymer and B. from 1 to 50% by weight of a polymer of low compatibility with A.

A are polystyrene and copolymers of styrene which incorporate at least 80% by weight of styrene in the polymer. Examples of comonomers are α-methylstyrene, ring-halogenated styrenes, ring-alkylated styrenes, acrylonitrile, (meth)acrylates of alcohols having from 1 to 8 carbon atoms, N-vinyl compounds, such as vinylcarbazole, or else small amounts of compounds which have two polymerizable double bonds, for example butadiene, divinylbenzene or butanediol diacrylate. Polystyrene is preferred.

The mixture of polymers A+B comprises from 1 to 50% by weight, preferably from 2 to 35% by weight, of a polymer B of low compatibility with A. The preferred amount is from 3 to 10% by weight if polymer B is polypropylene, and for polymethyl methacrylate it is from 10 to 25% by weight.

The incompatibility of B with A is determined as follows:

The glass transition temperature of the mixture of polymers is measured by DSC. If the glass transition points of the individual components are detectable separately in the DSC curve and have not been markedly shifted compared with the glass transition points of the individual components when pure, incompatibility is present. In case of doubt, the incompatibility of A with B can also be determined by electron microscopy, which if incompatibility is present shows two distinct phases if appropriate contrasting is used, phase A being the coherent phase.

Suitable polymers B are polyethylene, polypropylene, ethylene-vinyl acetate copolymer, polyurethane, polyamides, polycarbonate, polyether sulfones, polyoxymethylene, polyvinyl chloride and polyimide. Preference is given to polymethyl acrylate and polypropylene.

Another aspect of the present invention is that of open-cell moldable foams with increased heat resistance. These are obtained if the mixture of polymers A+B also comprises from 5 to 50% by weight, preferably from 10 to 30% by weight, based on A+B, of a thermoplastic C with a glass transition temperature above 140° C., preferably above 180° C. Examples of suitable thermoplastics C are styrene-maleic anhydride copolymers and polyphenylene sulfide, and preference is given to polyphenylene ethers. Adding the thermoplastic C raises the glass transition temperature of the thermoplastic matrix A+C to above 105° C., with the result that the foam does not soften, e.g. when vacuum panels are foamed into polyurethane.

The starting material for producing the novel open-cell moldable foams is pellets comprising blowing agent. To prepare these, the polymers A, B and, if desired, C are first mixed in the melt, with conventional additives.

Conventional additives and/or auxiliaries which may be added to the thermoplastic matrix are conventional amounts of stabilizers, dyes, fillers, flame retardants and/or nucleating agents, preferably from 1 to 10% by weight, based on A+B+C, of an infrared absorber, e.g. aluminum powder or titanium dioxide powder, or of particulate carbon, in particular graphite powder, further increasing the open-cell content.

The pellets obtained after mixing are then impregnated with volatile blowing agents, using conventional processes, preferably in aqueous suspension at from 100 to 150° C. and at a pressure of from 3 to 15 bar. Suitable blowing agents are saturated aliphatic $C_4$–$C_7$ hydrocarbons, in particular pentane.

In principle it is also possible for pellets A which comprise blowing agent to be mixed in the extruder with pellets B, and, where appropriate, C; alternatively, blowing agent may be introduced during the mixing of A, B, and, where appropriate, C. In these processes, the melt extrudate from the extruder is then usefully subjected, while under pressure, to underwater die-face cutting for pelletization.

The pellets comprising blowing agents are then prefoamed, using steam at temperatures of from 60 to 160° C., whereupon—due to the polymer B which has been added and has low compatibility with polystyrene—the cell membranes break open to give an open-cell moldable foam. The density of the moldable foam can be adjusted as desired by repeated foaming. Finally, the moldable foam is sintered, using steam or hot air, in non-gas-tight molds, to give foam moldings. According to the invention, these have an open-cell content of more than 80%, preferably more than 90%, in particular at least 95%. If the open-cell content is too low the molding cannot be adequately evacuated. Its cells then hold too much gas, and thermal conductivity is not lowered sufficiently.

The novel open-cell molded foams may be evacuated to give vacuum moldings. These are used as vacuum panels in low-temperature insulation systems, e.g. in refrigerators, freezers and low-temperature transportation systems.

EXAMPLE 1

Inventive

A twin-screw extruder is used to prepare a blend made from 95% of polystyrene (VPT, BASF AG) and 5% of polypropylene (3200 MC, BASF AG). 20 kg of the pellets obtained by cold cutting (maximum diameter about 1.5 mm) are placed in a pressure-tight stirred vessel with an initial charge of 20 kg of deionized water, 35 g of sodium pyrophosphate and 70 g of magnesium sulfate (Epsom salts) and 1.8 g of K 30 emulsifier as suspension stabilizer. The contents of the vessel are heated to 125° C., and once 110° C. has been reached 1600 g of pentane are metered in. After the vessel has been held at 125° C. for 4 h it is cooled to room temperature. This gives compact beads, which were foamed using steam in a batch pressure-prefoamer as known for processing EPS, at a gage pressure of 0.3 bar. The resultant foam beads had a bulk density of 15 g/l. The individual beads were sintered to obtain a foam molding of the same density. The resultant foam molding had an open-cell content of 95%. The open-cell content was determined to ASTM D 2856-87, method C, using an Accupyc 1330 device.

EXAMPLE 2

Comparison

Similar to Example 1, but without polypropylene. The resultant foam molding had an open-cell content of 0%.

EXAMPLE 3

Inventive

Similar to Example 1, but with 80% of polystyrene and 20% of polymethyl methacrylate (Lucryl G77E). The resultant foam molding had an open-cell content of 95%.

We claim:

1. Moldable foam pellets having an open-cell content of more than 80%, wherein the thermoplastic matrix comprises
   A. from 99 to 50% by weight of a styrene polymer, and
   B. from 1 to 50% by weight of a polymer of low compatibility with the styrene polymer, and
   C. from 5 to 50% by weight, based on A+B, of a thermoplastic which is compatible with A and has a glass transition temperature above 140° C.

2. A moldable foam as claimed in claim 1, wherein thermoplastic A is polystyrene.

3. A moldable foam as claimed in claim 1, wherein the polymer B is polyethylene, polypropylene, an ethylene-vinyl acetate copolymer, a polyurethane or polymethyl methacrylate.

4. The moldable foam pellets as claimed in claim 1, wherein the thermoplastic C is a polyphenylene ether.

5. A moldable foam as claimed in claim 1, which comprises from 1 to 10% by weight, based on A+B+C, of athermanous particles, preferably graphite.

6. A process for producing the moldable foam pellets as claimed in claim 1, by impregnation of pellets which comprise the polymers A, B and C with from 3 to 15% by weight, based on A+B+C, of a volatile blowing agent in aqueous suspension under superatmospheric pressure and elevated temperature, and expansion of the pellets comprising blowing agents, to give open-cell moldable foam pellets.

7. An open-cell foam molding prepared from the moldable foam pellets as claimed in claim 1.

8. The moldable foam pellets as claimed in claim 1, wherein the glass transition temperature of the thermoplastic C is above 180° C.

9. The moldable foam pellets as claimed in claim 1, wherein the thermoplastic C is selected from the group consisting of styrene-maleic anhydride copolymers, polyphenylene sulphide, and polyphenylene ethers.

10. The moldable foam pellets as claimed in claim 1, wherein the styrene polymer A is a copolymer.

11. The moldable foam pellets as claimed in claim 10, wherein the copolymer is a copolymer of styrene with a monomer selected from the group consisting of α-methylstyrene, ring-halogenated styrenes, ring-alkylated styrenes, acrylonitrile, (meth)acrylates of alcohols having from 1 to 8 carbon atoms, N-vinyl compounds, vinylcarbazole, butadiene, divinylbenzene, and butanediol diacrylate.

12. The moldable foam pellets as claimed in claim 1, wherein the thermoplastic matrix comprises 2 to 35% by weight of a polymer B based on the amount of A+B.

13. The moldable foam pellets as claimed in claim 1, wherein the polymer B is polypropylene in an amount of from 3 to 10% by weight based on the amount of A+B.

14. The moldable foam pellets as claimed in claim 1, wherein the polymer B is polymethyl methacrylate in an amount of 10 to 25% by weight based on the amount of A+B.

15. The moldable foam pellets as claimed in claim 1, wherein the amount of thermoplastic C is 10 to 30% by weight based on the amount of A+B.

16. The moldable foam pellets as claimed in claim 1, further comprising additional additives and/or auxiliaries.

17. The moldable foam pellets as claimed in claim 16, wherein the additional additives and/or auxiliaries are selected from the group consisting of stabilizers, dyes, fillers, flame retardants, nucleating agents, infrared absorbers, aluminum powder, titanium dioxide powder, particulate carbon, particulate graphite and mixtures thereof.

18. The moldable foam pellets as claimed in claim 16, wherein the additional additives and/or auxiliaries are present in an amount of 1 to 10% by weight based on the amount of A+B+C.

19. The moldable foam pellets as claimed in claim 1, further comprising a blowing agent.

* * * * *